(12) United States Patent
Hsu

(10) Patent No.: US 6,525,948 B2
(45) Date of Patent: Feb. 25, 2003

(54) APPARATUS AND METHOD FOR THE DETECTION OF CIRCUIT IRREGULARITIES AND FOR CIRCUIT PROTECTION OF A POWER SUPPLY

(75) Inventor: Wen-Kuan Hsu, Taoyuan Sien (TW)

(73) Assignee: Delta Electronics Inc., Taoyuan Sien (TW)

( * ) Notice: Subject to any disclaimer, the term of this patent is extended or adjusted under 35 U.S.C. 154(b) by 0 days.

(21) Appl. No.: 09/940,515

(22) Filed: Aug. 29, 2001

(65) Prior Publication Data

US 2002/0075699 A1 Jun. 20, 2002

(30) Foreign Application Priority Data

Dec. 19, 2000 (TW) .................................. 89127246 A

(51) Int. Cl.[7] .............................................. H02M 7/122
(52) U.S. Cl. ...................................... 363/56.11; 363/19
(58) Field of Search ........................ 363/18, 19, 56.01, 363/56.09, 56.11, 56.12

(56) References Cited

U.S. PATENT DOCUMENTS

| | | | | |
|---|---|---|---|---|
| 5,978,234 A | * | 11/1999 | Nagahira ...................... | 363/19 |
| 6,072,702 A | | 6/2000 | Nakao et al. | |
| 6,081,433 A | * | 6/2000 | Nishida et al. ............... | 363/19 |
| 6,101,103 A | | 8/2000 | Miyazaki et al. | |
| 6,198,637 B1 | * | 3/2001 | Hosotani et al. .............. | 363/19 |
| 6,295,211 B1 | * | 9/2001 | Nishida et al. ............... | 363/19 |

* cited by examiner

*Primary Examiner*—Matthew Nguyen
(74) *Attorney, Agent, or Firm*—Birch, Stewart, Kolasch & Birch, LLP

(57) ABSTRACT

The present invention provides a ring choke converter, a kind of power supply, and method thereof. In addition to the transformer, the switch component, the positive feedback circuit and the regulation control circuit in a conventional RCC, the present invention provides a control circuit partially powered by terminal of the opposite polarity at the feedback winding of the transformer. With the circuit design of the control circuits disclosed in this invention, under-voltage protection (UVP), over-voltage protection, and over-load protection, together with stable output voltage are all achieved.

16 Claims, 3 Drawing Sheets

APPARATUS AND METHOD FOR THE DETECTION OF CIRCUIT IRREGULARITIES AND FOR CIRCUIT PROTECTION OF A POWER SUPPLY

BACKGROUND OF THE INVENTION

1. Field of the Invention

The present invention relates to a switched power supply, and more particularly relates to a switched power supply using ringing choke converter (RCC) system.

2. Description of the Related Art

Household appliances, such as video cassette recorders (VCR) or fax machines, require a DC power supply that provides stable voltage drawing excessive amounts of power. Due to efficiency and relatively simple structure, switched power supplies using RCC system are widely utilized as for household appliances, transforming household AC power to the DC power required by the appliance circuits.

An RCC system, or RCC structure, has been disclosed in many patents such as in U.S. Pat. No. 6,081,433, U.S. Pat. No. 6,101,103, and U.S. Pat. No. 6,072,702.

FIG. 1 is a simple perspective view of a conventional RCC. AC represents external AC power. Through a diode bridge DB and a filtering capacitor C1, AC is transformed into high voltage DC power at node 1 to act as the main power for the RCC structure.

RCC structure comprises a transformer T, a switch component FET Q1, a starting resistor RS, a positive feedback circuit 40, a control circuit 46, and an output rectifier 42. The transformer T has at least three windings; a primary winding N1, a secondary winding N2 with an opposite polarity to N1, and a feedback winding Nb with the same polarity as N1. The switch component FET Q1 is connected in series to terminal 2 of the primary winding N1. The starting resistor RS is connected between terminal 1 of the primary winding N1 and the gate of the switch component FET Q1. The positive feedback circuit 40 comprises a resistor R4 and a capacitor C3, both connected in series between terminal 3 of the feedback winding Nb and the gate of the switch component FET Q1. The control circuit 46 is connected between terminal 3 of the feedback winding Nb and the gate of the switch component FET Q1. The output rectifier 42 has a serial connected diode CR51 and a parallel connected capacitor C51. The anode of the diode CR51 is connected to terminal 5 of the secondary winding N2.

When high voltage at terminal 1 of the primary winding N1 occurs, the resulting current through the RS gradually charges the gate of the FET Q1. When the voltage difference between the gate of the FET Q1 and the source of the FET Q1 reaches a threshold voltage Vt of the FET Q1, the FET Q1 is activated to conduct current through terminal 1 and terminal 2 of the primary winding N1. The current change between terminal 1 and terminal 2 generates an induction voltage between terminal 4 and terminal 3 of the feedback winding Nb. Via a coupling effect of positive feedback circuit 40, the induction voltage increases the voltage of the gate of the FET Q1 and, as a result, increases the current value of the current between terminal 1 and terminal 2. This positive feedback continues to increase the current value of the current between terminal 1 and terminal 2, and stores sufficient current energy at primary winding N1.

The resistor R5 and the capacitor C5 of the control circuit 46 consist of an RC delay circuit. When the capacitor C5 is charged to a certain level, the transistor Q3 is activated to decrease the voltage of the gate of the FET Q1 and thereby deactivate the FET Q1. At switching, the current energy stored at the primary winding N1 is transferred to the secondary winding N2 and the feedback winding Nb. An induction current at the secondary winding N2 charges the capacitor C51, and provides power to the external circuit via terminal Vo. Feedback winding Nb, resistor R4 and capacitor C3 construct an LC oscillator. When the voltage at terminal 3 oscillates and is converted from a negative value to a predetermined positive value, via the coupling of the capacitor C3, the FET Q1 is activated again and stores the current energy at the primary winding N1. Through repeated cycles, the primary winding N1 continues to transfer the current energy to the secondary winding N2.

Though the above-described RCC structure oscillates, it does not guarantee a fixed voltage difference between the Vo and the GND. In other words, if the secondary winding N2 continues to charge C51, it is possible that the resulting high voltage difference between the Vo and the GND may damage the circuit connected between the Vo and the GND.

Accordingly, most of the RCC structure further includes a detect circuit 48 comprising a light emitting diode PD and a zener diode ZD, connected between two terminals of the capacitor C51, as shown in FIG. 1. When the voltage difference of the capacitor C51 is higher than the breakdown voltage of the zener diode ZD, the light emitting diode Pd emits light. It follows that the photo-transistor PT of the control circuit 46 is activated by the received light from the light emitting diode PD. The process is served to decrease the time required for charging the capacitor C5 to activate the transistor Q3. The process avoids overloading of current stored at the primary winding and maintains an acceptable voltage level between the Vo and the GND.

However, if the AC voltage experiences a shortage, that is, if the main power voltage of the RCC structure decreases, the induction voltage generated at terminal 3 of the feedback winding Nb also decreases. Consequently, the control circuit 46 does not have sufficient voltage to activate the Q3 and is not able to deactivate FET Q1. Thus, FET Q1 may be continuously activated, wasting electrical power.

SUMMARY OF THE INVENTION

As a result, the main object of the present invention is to provide a switched power supply using RCC system that prevents the problem of power waste when AC voltage is in limited supply.

Another object of the present invention is to avoid unnecessary power output when the output load is excessive.

Another object of the present invention is to efficiently avoid excessive output voltage.

Still another object of the present invention is to efficiently decrease the power consumption of the switched power supply when there is no output load to meet environmental concerns.

Based on the above mentioned objects, the present invention provides a switched power supply comprising a transformer, a switch component, a rectifier circuit, a positive feedback circuit, a control circuit and a regulated control circuit. The transformer includes at least a primary winding, a secondary winding and a feedback winding. The switch component includes a main control terminal and is connected in series to the primary winding. The rectifier circuit is connected to the secondary winding and used to output DC voltage. The positive feedback circuit is connected between the first terminal of the feedback winding and the main control terminal. When the switch component is switched to the On position, the positive feedback circuit provides the main control terminal with a positive feedback voltage. The control circuit includes a first control component and a delay circuit, and is connected between the feedback winding and the main control terminal. The first control component is connected between the control terminal and a first ground and has a first control terminal. The delay circuit is connected between the first terminal and the first control terminal. After the switch component is switched to the On position for a predetermined interval, the feedback winding receives a first voltage to switch the first control to the On position and thereby switch the switch component to the Off position. The regulated control circuit is connected between a second terminal of the feedback winding and the first control terminal. When the DC voltage reaches a first predetermined voltage value, the regulated control circuit provides a second voltage to switch the first control component to the On position and thereby switch the switch component to the Off position.

The present invention further provides a method for controlling a switched power supply. The switched power supply comprises a transformer, a switch component and a rectifier circuit. The method comprises the following steps: (1) providing a main control terminal of the switch component with a positive feedback voltage by the positive feedback circuit when the switch component is switched to the On position; (2) providing the first control component with a first voltage by the first terminal to switch the switch component to a off state after the switch component is switched to the On position for a predetermined interval; and (3) providing the first control component with a second voltage by a second terminal of the feedback winding to switch the switch component to a off state, when the DC voltage reaches a first predetermined voltage value.

The advantage of the present invention is that it provides an efficient apparatus and method for under-voltage protection (UVP), over-voltage protection, and overload protection. In addition, the present invention provides features to efficiently decrease power consumption of the RCC structure when the RCC structure is not loaded.

BRIEF DESCRIPTION OF THE DRAWINGS

The present invention can be more fully understood by reading the subsequent detailed description in conjunction with the examples and references made to the accompanying drawings, wherein.

DETAILED DESCRIPTION OF THE PREFERRED EMBODIMENT

Figure 1:
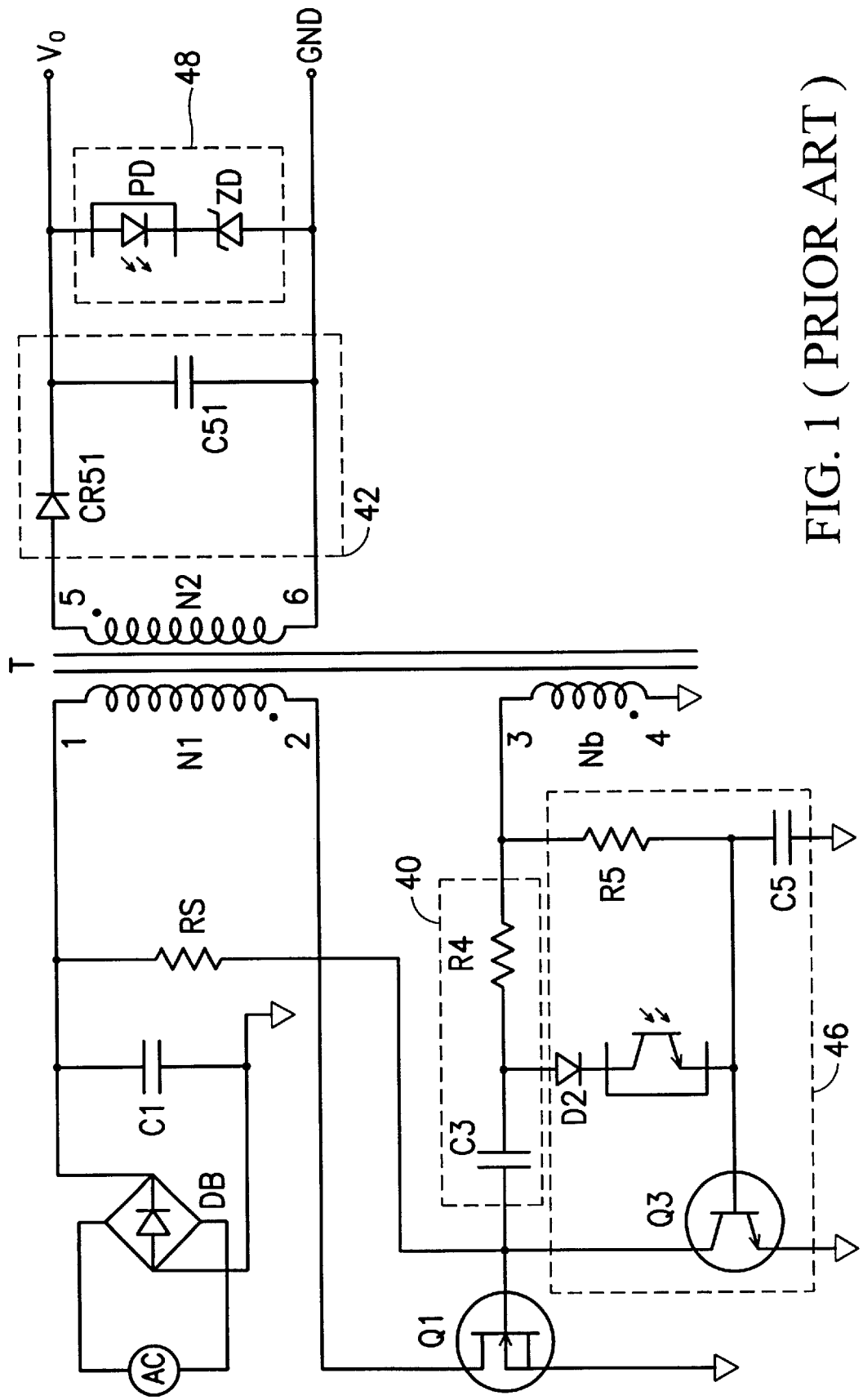
FIG. 1 is a perspective view of a conventional RCC circuit.
Figure 2:
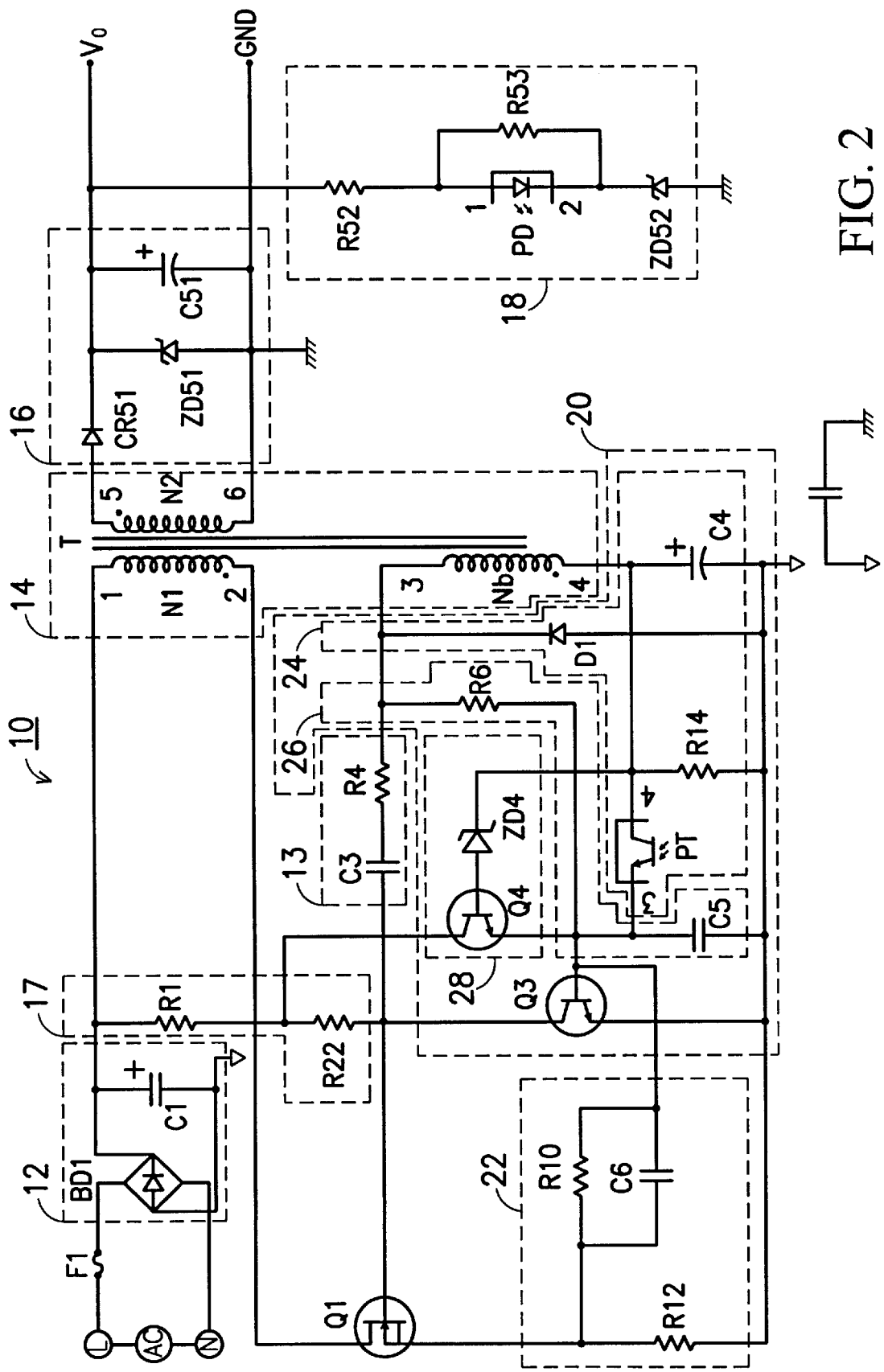
FIG. 2 is a perspective view of the circuit of a switched power supply using FET as the switch component in accordance with the present invention.

FIG. 2 is a perspective view of the circuit of the switched power supply using an RCC system in accordance with the present invention.

The switched power supply 10 of the invention comprises an AC to DC rectifier 12, a starting circuit 17, a transformer 14, a output rectifier 16, a switch transistor FET Q1, a positive feedback circuit 13, an over-current protection circuit 22, a control circuit 20 and a detect circuit 18.

The AC to DC rectifier 12 comprises a diode bridge BD1 and a smoothing capacitor C1, and provides the DC power for the operation of the RCC structure.

The transformer 14 has at least three windings; primary winding N1, secondary winding N2 with an opposite polarity to N1, and feedback winding Nb with the same polarity as N1. As shown in the FIG. 2, two terminals of the primary winding N1 are called terminal 1 and terminal 2 respectively. Two terminals of the feedback winding Nb are called terminal 3 and terminal 4. Two terminals of the secondary winding N2 are called terminal 5 and terminal 6.

The starting circuit 17 comprises a resistor R1 and a resistor R22 connected in series between terminal 1 of the primary winding N1 and the gate of the switch component FET Q1, and provides starting current required when the RCC system is powered up. The switch transistor FET Q1 is connected in series to terminal 2 of the primary winding N1 and controls the current flow of the primary winding N1. The over-current protection circuit 22 comprises a resistor R12, a resistor R10 and a capacitor C6, and detects current volume through the switch transistor FET Q1. The positive feedback circuit 13 comprises a resistor R4 and a capacitor C3 connected in series between terminal 3 of the feedback winding Nb and the gate of the switch transistor FET Q1.

The control circuit 20 is connected between terminal 3 of the feedback winding Nb and the gate of the switch component FET Q1. The control circuit 20 comprises a bipolar junction transistor Q3, an RC delay circuit 26, a regulated control circuit 24, and a sense circuit 28.

The RC delay circuit 26 comprises a resistor R6 and a capacitor C5. The resistor R6 is connected between terminal 3 of the feedback winding Nb and the base of the bipolar junction transistor Q3. The capacitor C5 is connected between the first ground and the base of the bipolar junction transistor Q3.

The regulated control circuit 24 comprises a diode D1, a resistor R14, a capacitor C4 and a photo-transistor PT. The resistor R14 and the capacitor C4 are connected in parallel between terminal 4 of the feedback winding Nb and the first ground. The diode D1 is connected between the first ground and terminal 3 of the feedback winding Nb. The photo-transistor PT is connected between terminal 4 of the feedback winding Nb and the base of the bipolar junction transistor Q3.

The sense circuit 28 comprises a zener diode ZD4 and a bipolar junction transistor Q4. The bipolar junction transistor Q4 is connected between the base of the bipolar junction transistor Q3 and the connecting point of resistor R1 and resistor R22. The zener diode ZD4 is connected to the base of the bipolar junction transistor Q4 and terminal 4 of the feedback winding Nb.

The output rectifier 16 is connected to the secondary winding N2 and comprises a rectifier diode CR51, a zener diode ZD51, and a smoothing capacitor C51. The anode of the rectifier diode CR51 is connected to terminal 5 of the secondary winding N2. The cathode of the zener diode ZD51, the cathode of the rectifier diode CR51 and the positive terminal of the smoothing capacitor C51 are connected to a point acting as the positive terminal of the DC voltage. The anode of the zener diode ZD51, the negative terminal of the smoothing capacitor C51 and terminal 6 of the secondary winding N2 are connected to a point acting as the second ground, a ground terminal of the output DC voltage.

The detect circuit 18 is connected between the positive output terminal of the DC voltage and the second ground, and comprises a resistor R52, a light emitting diode PD, a resistor R53 and a zener diode ZD52.

The operating process of the switched power supply 10 is further described as follows.

When the AC power is not connected, the FET Q1 is in the Off position. When the AC power is connected, a starting current charges the gate of the FET Q1 via the resistor R1 and the R22. If the voltage difference between the gate of the FET Q1 and the source of the FET Q1 is higher than a threshold voltage Vt of the FET Q1, the FET Q1 is activated and a current is consequently generated through terminal 1 to terminal 2 of the primary winding.

When FET Q1 is activated, the current through terminal 1 to terminal 2 increases and an induction current resulting from the electromagnetic induction of the feedback winding Nb is generated through terminal 4 to terminal 3. The induction voltage generated at terminal 3 undergoes a coupling effect occurring at the resistor R4 and the capacitor C3 and increases the voltage at the gate of the FET Q1. The induction voltage also increases the current through terminal 1 to terminal 2. It follows that positive feedback is established and continues to increase the current between terminal 1 and terminal 2.

There are at least two methods for deactivating the FET Q1. The first method has to go through the RC delay circuit 26. When the voltage of terminal 3 increases, the RC delay time from going through the resistor R6 and resistor C5, and the voltage of the base of the bipolar junction transistor Q3 also increases. If the voltage difference between the base of the bipolar junction transistor Q3 and collector reaches the turn-on voltage of the bipolar junction transistor Q3, the bipolar junction transistor Q3 is activated. It follows that the voltage of the gate of the FET Q1 drops approximately to 0 and thereby the FET Q1 is deactivated. The second method has to go through the over-current protection circuit 22. The voltage value crossing the resistor R12 in the over-current protection circuit 22 is in proportion to the current value through terminal 1 and terminal 2. When the voltage crossing the resistor R12 reaches a certain level, via the coupling of the resistor R10 and the capacitor C6, the base voltage of the bipolar junction transistor Q3 also increases to a set level, thereby activating the bipolar junction transistor Q3 and deactivating the FET Q1.

When the FET Q1 is deactivated, the current value going through terminal 1 to terminal 2 drops to 0 simultaneously. As a result, the current energy stored at the primary winding N1 is then transferred to the secondary winding N2 and the feedback winding Nb. The current generated at the secondary winding N2 goes through terminal 6 to terminal 5, charges the capacitor C51 via diode CR51, and increases the voltage of the positive terminal of the capacitor C51. The current generated at the feedback winding Nb goes through terminal 3 to terminal 4, charges the capacitor C4 and at the same decreases the voltage value of terminal 3. Due to the clamping effect of the diode D1, the lowest voltage at terminal 3 is 0.

When the current energy at the secondary winding N2 is finished, the voltage of terminal 3 of the feedback winding Nb begins to increase from 0 to a positive value. The current through terminal 3 to terminal 4 changes direction along with the oscillation. Via the coupling of the capacitor C3 and the resistor R4, the voltage of the gate of the FET Q1 is increased. If voltage difference between the gate of the FET Q1 and the source of the FET Q1 is higher than the threshold voltage (Vt), the FET Q1 is activated and a current at the primary winding N1 is generated. The activation of the FET Q1 at the same time starts the above mentioned positive feedback and continues to increase the current through terminal 1 to terminal 2.

Based on the analysis above, it is known that the FET Q1 is activated and deactivated repeatedly so as to transfer the energy to the secondary winding N2. The process is thus used to generate DC power.

After several cycles of FET Q1's activation and deactivation, terminal 4 of the feedback winding Nb then forms voltage, higher than the first ground due to the combination of the diode D1, capacitor C4 and resistor R14.

The detect circuit 18 and the regulated control circuit 24 control the voltage of the output DC power. When the voltage of the Vo is higher than a predetermined level, the zener diode ZD52 enters a breakdown state. As a consequence, the light emitting diode Pd is powered on and thereby causes the light emitting diode Pd to emit light. Based on the presence of the light, the photo-transistor PT determines the connection level between terminal 4 of the feedback winding Nb and the base of the bipolar junction transistor Q3. Terminal 4 of the feedback winding Nb can serve as the voltage source of the base of the bipolar junction transistor Q3. If the voltage of the Vo is higher than the predetermined level, voltage of the base of the bipolar junction transistor Q3 maintains the bipolar junction transistor Q3 in an activated state. When the FET Q1 maintains a deactivated state, it stops the activation/deactivation cycle, and the voltage between the Vo and the GND as a result is maintained at a certain level.

When terminal 4 of the feedback winding Nb is higher than other predetermined levels, zener diode ZD4 enters a breakdown state, turning on the bipolar junction transistor Q4, and, as a result, a bipolar junction transistor Q3 is activated to deactivate the FET Q1.

The main feature of the present invention is that terminal 4 of the feedback winding Nb generates voltage for photo-transistor PT and the sense circuit 28.

The switched power supply 10 of the invention delivers the following advantages:

1. The present invention provides protection against under-input voltage. When under-input AC voltage occurs, the voltage of terminal 3 of the feedback winding Nb is decreased. Accordingly, the resistor R6 and the capacitor C5 cannot provide sufficient voltage to activate the bipolar junction transistor Q3, and thereby deactivate the FET Q1. Under these circumstances, the activation and deactivation cycle of the FET Q1 repeats via the over-current protection circuit 22 and continues to increase the voltage value of the Vo. Due to the fact that terminal 5 of the secondary winding N2 and terminal 4 of the feedback winding Nb have the same polarity, the voltage of terminal 4 of the feedback winding Nb is in approximate proportion to the voltage of terminal 5 of the secondary winding N2. Therefore, the voltage of terminal 4 of the feedback winding Nb can be used as the voltage source of the base of the bipolar junction transistor Q3. Furthermore, the bipolar junction transistor Q3 can also be activated via the effect resulting from the light emitting diode PD and the coupled photo-transistor PT, and thereby deactivate the FET Q1 so as to prevent the voltage value of the Vo from increasing.

2. The present invention provides protection against over-output voltage. If detect circuit failure occurs due to unexpected factors, the failure results in the failure of the light emitting diode PD and the photo-transistor PT.

Based on the analysis described in item 1, it is understood that the voltage value of the Vo then increases and the voltage of terminal 4 of the feedback winding Nb also increases. When the voltage value of terminal 4 of the feedback winding Nb is higher than a predetermined level, via the breakdown of the zener diode ZD4 and the activation of the bipolar junction transistor Q4, the base of the bipolar junction transistor Q3 then receives voltage from the connecting point of the resistor R1 and the resistor R22. It follows that the received voltage activates the bipolar junction transistor Q3, thereby deactivating the FET Q1. The deactivation and activation cycle of the FET Q1 is thus stopped. However, the activation and deactivation cycle of the FET cannot be re-initiated until the voltage value of the Vo is decreased to a certain level and voltage of terminal 4 of the feedback winding Nb leaks through the resistor R14 or other circuit path to a certain level.

3. The present invention provides protection against overload. When output overload occurs, that is, when a low equivalent resistance load is added between the Vo and the GND, the voltage crossing the resistor R12 of the over-current protection circuit 22 is in proportion to the current value through terminal 1 to terminal 2. When the voltage crossing the resistor R12 reaches a certain level, via the coupling of the resistor R10 and the capacitor C6, the base voltage of the bipolar junction transistor Q3 also increases to a level to activate the bipolar junction transistor Q3 and thereby deactivate the FET Q1. The voltage value of terminal 4 of the feedback winding Nb does not decrease along with the decrease of the output voltage of the Vo. On the other hand, the voltage value of terminal 4 of the feedback winding Nb remains, providing a reverse current through the zener diode ZD4. In addition, the bipolar junction transistor Q4 shares the current through the resistor R1 via the effect of the bipolar junction transistor Q4. As a consequence, the current charging the gate of the FET Q1 decreases relatively, also delaying the timing of the activation of the FET Q1. The activation and deactivation cycle of the FET cannot be re-initiated until the voltage value of the Vo is decreased to a certain level and voltage of terminal 4 of the feedback winding Nb leaks through the resistor R14 or other circuit path to a certain level. Accordingly, the power consumption of the power supply is decreased due to the delayed timing of the activation of the FET Q1.

4. The present invention lowers the power consumption of the switched power supply when the switched power supply is not loaded. When the output point between the Vo and the GND is not loaded, leakage of terminal 4 of the feedback winding Nb determines the timing of the activation of the FET Q1. Another factor determining the timing of the activation of the FET Q1 is the current volume that the gate of the FET Q1 received from the starting circuit 17. As the advantage described in item 3, the bipolar junction transistor Q4 shares the current through the resistor R1. Accordingly, the current charging the gate of the FET Q1 decreases relatively, which also delays the timing of the activation of the FET Q1. That is, when the switched power supply is not loaded, the activation of the FET Q1 and the timing of the activation and deactivation cycle of the FET is inevitably delayed. In short, the overall power consumption average of the switched power supply 10 is decreased.

Figure 3:
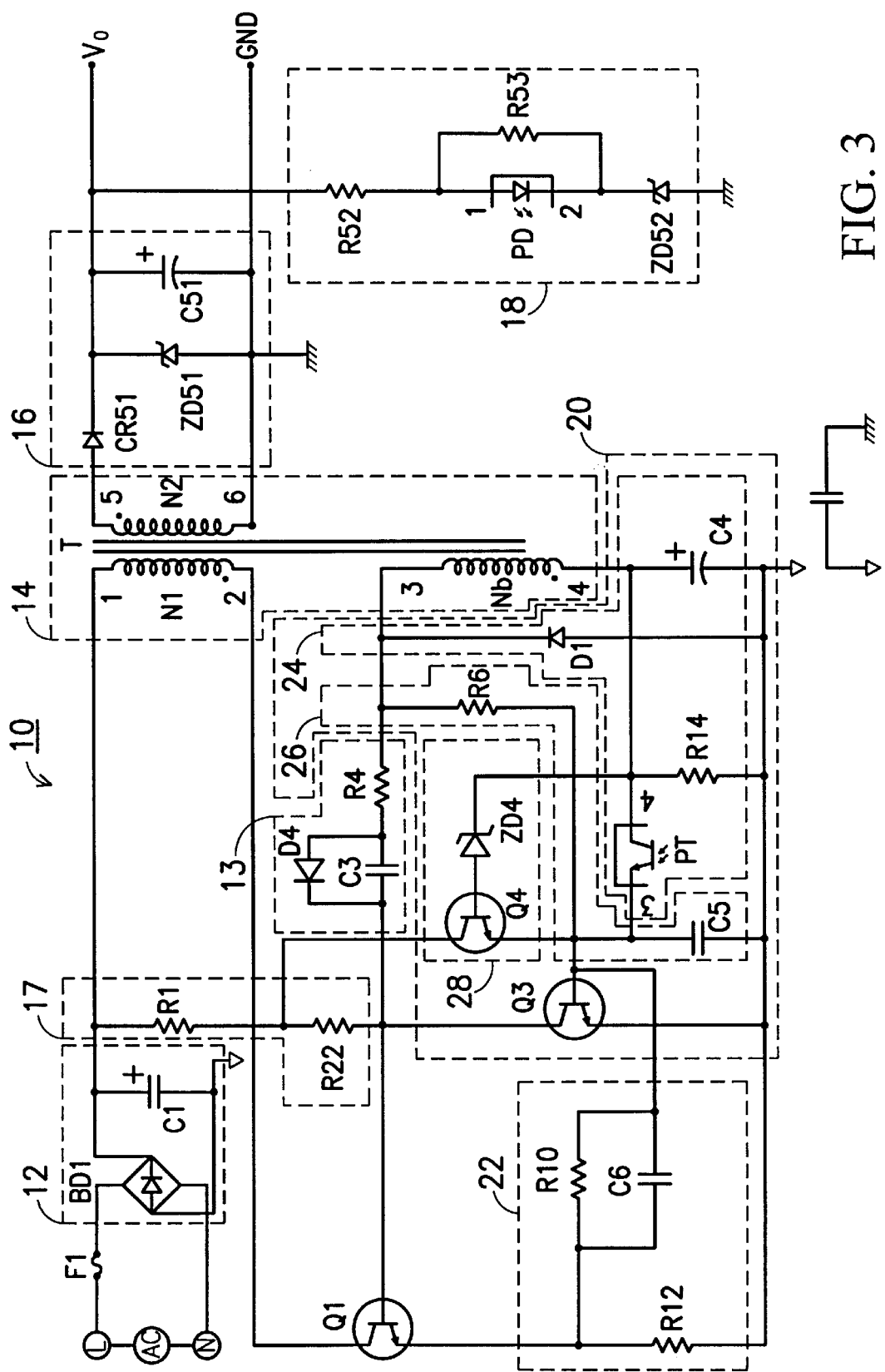
FIG. 3 is a perspective view of the circuit of a switched power supply using a bipolar junction transistor as the switch component in accordance with the present invention.

In the switched power supply using RCC system of the invention, the FET Q1 can also be substituted with a high power bipolar junction transistor as shown in the FIG. 3. In order to provide a sufficient bias current to the bipolar junction transistor Q1 during positive feedback, a diode D4 has to be added to the positive feedback circuit 13 in a manner shown in FIG. 3.

Distinct from the conventional switched power supply using RCC system, the switched power supply of the invention forms a voltage source at terminal 4 of the feedback winding Nb. The voltage source is used as power for the photo-transistor PT and the sense circuit 28. As a consequence, the present invention resolves problems that may be caused by under-input voltage, over-output voltage, and overload. In addition, the switched power supply of the invention decreases power consumption when the switched power supply is not loaded.

Finally, while the invention has been described by way of examples and in terms of the preferred embodiments, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A switched power supply comprising:

a transformer comprising a primary winding, a secondary winding and a feedback winding;

a switch component connected in series to the primary winding and comprising a main control terminal;

a rectifier circuit for outputting DC voltage, connected to the secondary winding;

a positive feedback circuit connected between the first terminal of the feedback winding and the main control terminal, wherein when the switch component is switched to an on position, the positive feedback circuit provides the main control terminal with positive feedback voltage;

a control circuit connected between the feedback winding and the main control terminal, the control circuit comprising:

a first control component, comprising a first control terminal, and connected between the control terminal and a first ground;

a delay circuit connected between the first terminal and the first control terminal, wherein after the switch component is switched to the on position for a predetermined interval, the feedback winding receives a first voltage to switch the first control to the on position and thereby switch the switch component to an off position; and a regulated control circuit connected between a second terminal of the feedback winding and the first control terminal, wherein when the DC voltage reaches a first predetermined voltage value, the regulated control circuit provides a second voltage for switching the first control component to the on position and thereby switching the switch component to the off position.

2. The switched power supply of claim 1, wherein the regulated control circuit comprises a resistor, a capacitor parallel connected between the second terminal and the first ground, and a diode used for forward connecting the first ground to the first terminal.

3. The switched power supply of claim 1, wherein the regulated control circuit comprises:
   a detect device connected to the rectifier circuit, used to detect DC voltage, wherein when the DC voltage reaches the first predetermined voltage value, the detect device sends a coupling signal; and
   a coupling control device, wherein when the coupling signal is received, the coupling control device connecting the second terminal to the first control terminal.

4. The switched power supply of claim 3, wherein the detect device is connected between the rectifier circuit and a second ground, the detect device comprises a current limiting resistor connected in series, a light emitting diode is forward connected in series and a zener diode is backward connected in series thereto, the coupling control device comprises a photo-transistor used for receiving light emitted from the light emitting diode and is used for connecting the second terminal to the first control terminal.

5. The switched power supply of claim 1, wherein the switched power supply further comprises a sense device connected between the second terminal and the first control terminal, wherein when a voltage value sensed at the second terminal is higher than a second predetermined voltage value, the sense device provides the first control terminal with a third voltage to switch the first control component to the On position and thereby switching the switch component to the off position.

6. The switched power supply of claim 5, wherein the switched power supply further comprises a starting device connected between the primary winding and the main control terminal of the switch component, and provides the switch component with a threshold voltage when the switched power supply is initially powered.

7. The switched power supply of claim 6, wherein the starting device comprises a first resistor and a second resistor connected in series.

8. The switched power supply of claim 7, wherein a connecting point between the first resistor and the second resistor provides the third voltage.

9. The switched power supply of claim 1, wherein the switched power supply further comprises an over-current protection circuit device providing the first control terminal with a fourth voltage for switching the control component to the On position and thereby switching the switch component to the Off position when a drive current the switch component reaches a predetermined current value.

10. The switched power supply of claim 9, wherein the over-current protection circuit device comprises a resistor connecting the switch component and the first ground.

11. A method for controlling a switched power supply, the switched power supply comprising:
   a transformer comprising a primary winding, a secondary winding and a feedback winding;
   a switch component connected in series to the primary winding comprising a main control terminal; and
   a rectifier circuit connected to the secondary winding outputting a DC voltage;
   the method comprising the following steps:
      providing the main control terminal with a positive feedback voltage by a first terminal of the feedback winding when the switch component is switched to an on position;
      providing the first control component with a first voltage by the first terminal to switch the switch component to an off position after the switch component is switched to the on position for a predetermined interval; and
      providing the first control component with a second voltage by a second terminal of the feedback winding to switch the component to the Off position when the DC voltage reaches a first predetermined voltage value.

12. The control method of claim 11, wherein the control method further comprises a following step, providing the first control terminal with a third voltage to switch the first control component to the on position and thereby switch the switch component to the Off position when a voltage value of the second terminal reaches a second predetermined voltage value.

13. The control method of claim 11, wherein the control method further comprises a following step, providing the main control terminal with a threshold voltage by a starting device to switch the switch component to the on position when a main power supply begins to supply power to the switched power supply.

14. The control method of claim 13, wherein the starting device is a divider circuit comprising a divider point used to generate the third voltage.

15. The control method of claim 11, wherein the control method further comprises a following step, providing the first control terminal with a fourth voltage to switch the first control component to the On position and thereby switch the switch component to the Off position when a drive current of the switch component reaches a predetermined current value.

16. A switched power supply comprising:
   a transformer comprising a primary winding, a secondary winding and a feedback winding;
   a switch component connected in series to the primary winding and comprising a main control terminal;
   a rectifier circuit for outputting DC voltage, connected to the secondary winding;
   a positive feedback circuit connected between the first terminal of the feedback winding and the main control terminal, wherein when the switch component is switched to an on position, the positive feedback circuit provides the main control terminal with positive feedback voltage;
   a control circuit connected between the feedback winding and the main control terminal, the control circuit comprising:
      a first control component, comprising a first control terminal, and connected between the control terminal and a first ground;
      a delay circuit connected between the first terminal and the first control terminal, wherein after the switch component is switched to the on position for a predetermined interval, the feedback winding receives a first voltage to switch the first control to the on position and thereby switch the switch component to an off position;
      a regulated control circuit connected between a second terminal of the feedback winding and the first control terminal, wherein when the DC voltage reaches a first predetermined voltage value, the regulated control circuit provides a second voltage for switching the first control component to the on position and thereby switching the switch component to the off position;
   a starting device connected between the primary winding and the main control terminal of the switch component, and provides the switch component with a threshold voltage when the switched power supply is initially powered, wherein the starting device comprises a first resistor and a second resistor connected in series;

a connecting point between the first resistor and the second resistor provides a third voltage; and a sense device having a second control component with a second control terminal and a zener diode, the second control component is connected between the connecting point and the first control terminal and the zener diode is connected between the second terminal and the second control terminal, wherein when a voltage value sensed at the second terminal is higher than a second predetermined voltage value, the second control component provides the first control terminal with the third voltage to switch the first control component to the on position and thereby switching the switch component to the off position.

* * * * *